United States Patent
Oh et al.

(10) Patent No.: US 10,667,332 B2
(45) Date of Patent: May 26, 2020

(54) INDUCTION HEAT COOKING APPARATUS

(71) Applicant: LG ELECTRONICS INC., Seoul (KR)

(72) Inventors: Dooyong Oh, Seoul (KR); Oksun Yu, Seoul (KR); Seungbok Ok, Seoul (KR); Byeongwook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 876 days.

(21) Appl. No.: 15/189,395

(22) Filed: Jun. 22, 2016

(65) Prior Publication Data

US 2016/0374152 A1 Dec. 22, 2016

(30) Foreign Application Priority Data

Jun. 22, 2015 (KR) .................. 10-2015-0088606

(51) Int. Cl.
*H05B 6/06* (2006.01)
*H05B 6/12* (2006.01)

(52) U.S. Cl.
CPC ........... *H05B 6/065* (2013.01); *H05B 6/1272* (2013.01); *H05B 2206/022* (2013.01); *Y02B 40/126* (2013.01)

(58) Field of Classification Search
CPC ................ H05B 6/065; H05B 6/1272; H05B 2206/022; Y02B 40/126
USPC ........ 219/620–622, 624–628, 662, 663, 489, 219/443.1, 656, 660, 661, 665–669, 219/448.11
See application file for complete search history.

(56) References Cited

U.S. PATENT DOCUMENTS

| | | | |
|---|---|---|---|
| 5,622,643 A * | 4/1997 | Morizot | H02M 7/53803 219/625 |
| 7,375,991 B2 * | 5/2008 | Shin | H04N 5/63 348/E5.127 |
| 2009/0139980 A1 * | 6/2009 | Acero Acero | H05B 6/04 219/489 |
| 2016/0150597 A1 * | 5/2016 | Yun | H05B 6/1272 219/624 |

* cited by examiner

*Primary Examiner* — Dana Ross
*Assistant Examiner* — Joseph M Baillargeon
(74) *Attorney, Agent, or Firm* — Fish & Richardson P.C.

(57) ABSTRACT

An electronic induction heat cooking apparatus includes first and second cooker modules including at least one heating coil and a dual heating coil, the first cooker module includes any one of an inner coil and an outer coil included in the dual heating coil, switching elements for operating the coil and a first microcontroller unit for controlling the switching elements, the second cooker module includes the other of the inner coil and the outer coil included in the dual heating coil, switching elements for operating the other coil and a second microcontroller unit for controlling the switching elements, and the first microcontroller unit and the second microcontroller unit share an oscillator.

4 Claims, 4 Drawing Sheets

INDUCTION HEAT COOKING APPARATUS

CROSS-REFERENCE TO RELATED APPLICATIONS

The present application claims priority under 35 U.S.C. 119 and 35 U.S.C. 365 to Korean Patent Application No. 10-2015-0088606 (filed on Jun. 22, 2015), which is hereby incorporated by reference in its entirety.

BACKGROUND

In general, an electronic induction heat cooking apparatus is an electric cooking apparatus for performing a cooking function by passing high-frequency current through a working coil or a heating coil and heating a cooking utensil by eddy current flowing when a strong line of magnetic force generated by the high-frequency current passes through the cooking utensil.

In the basic heating principle of the electronic induction heat cooking apparatus, the cooking utensil which is a magnetic body generates heat by induction heating as current is applied to a heating coil, and the cooking utensil itself is heated by the generated heat, thereby cooking food.

An inverter used for the electronic induction heat cooking apparatus serves to switch a voltage applied to the heating coil such that high-frequency current flows in the heating coil. The inverter drives a switching element generally composed of an insulated gate bipolar transistor (IGBT) such that high-frequency current flows in the heating coil, thereby forming a high-frequency magnetic field in the heating coil.

The power of the heating coil may be changed according to use of the heating coil. In general, a low-power heating coil and a high-power heating coil are formed and thus may be selectively used by a user according to purpose.

Meanwhile, if a three-phase voltage is applied, the power of the heating coil may be restricted to a predetermined value or less due to 1-phase allowed current restriction as in Europe. For example, when power of 3.7 kW or more cannot be output due to 1-phase allowed current restriction and high power of 5 kW or more is required, a dual heating coil having an inner coil and an outer coil is used.

FIG. 1 is a diagram illustrating heating of a cooking utensil using a dual coil in a conventional electronic induction heat cooking apparatus.

As shown in FIG. 1, the conventional electronic induction heat cooking apparatus includes an inner coil 41 and an outer coil 42 and a cooking utensil 50 is provided on the inner coils 41 and the outer coil 42.

The inner coil 41 may have a circular shape and the outer coil 42 may be provided outside the inner coil 41 and have a circular shape.

The electronic induction heat cooking apparatus may drive only the inner coil 41 of the dual heating coil according to the size of the cooking utensil 50 or user selection or drive the inner coil 41 and the outer coil 42 to heat the cooking utensil 50.

Meanwhile, if the dual heating coil is used, a two-phase voltage is used and two controllers are provided. In this case, since the oscillation frequencies of the controllers are different, the inner coil and the outer coil do not simultaneously operate, thereby reducing efficiency.

SUMMARY

An object of an embodiment of the present invention is to provide an electronic induction heat cooking apparatus having a plurality of heating coils, which is capable of being controlled using a minimum number of switching elements.

Another object of the present invention is to provide an electronic induction heat cooking apparatus capable of improving efficiency by controlling an inner coil and an outer coil with the same oscillation frequency.

An electronic induction heat cooking apparatus according to the present invention includes first and second cooker modules including at least one heating coil and a dual heating coil, the first cooker module includes any one of an inner coil and an outer coil included in the dual heating coil, switching elements for operating the coil and a first microcontroller unit for controlling the switching elements, the second cooker module includes the other of the inner coil and the outer coil included in the dual heating coil, switching elements for operating the other coil and a second microcontroller unit for controlling the switching elements, and the first microcontroller unit and the second microcontroller unit share an oscillator.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

Figure 1:
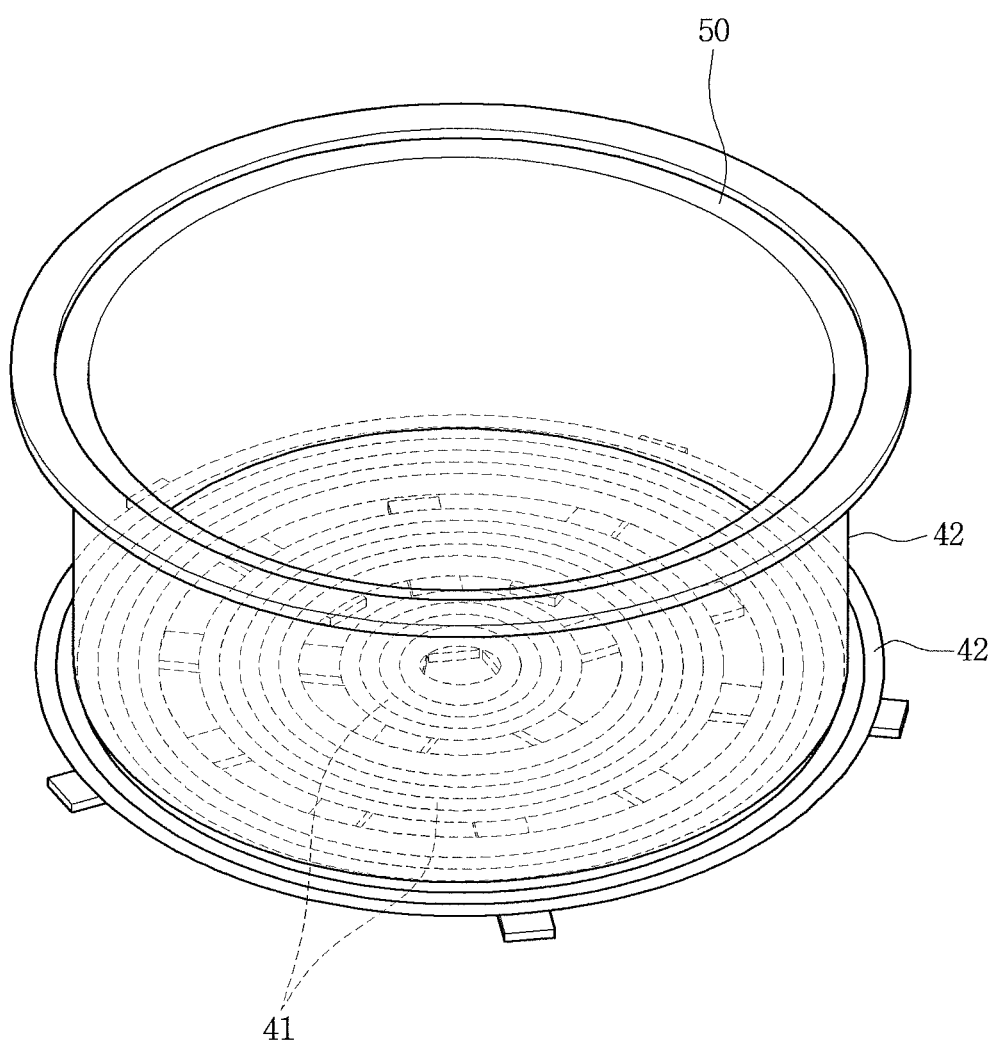
FIG. 1 is a diagram illustrating heating of a cooking utensil using a dual coil in a conventional electronic induction heat cooking apparatus.
Figure 2:
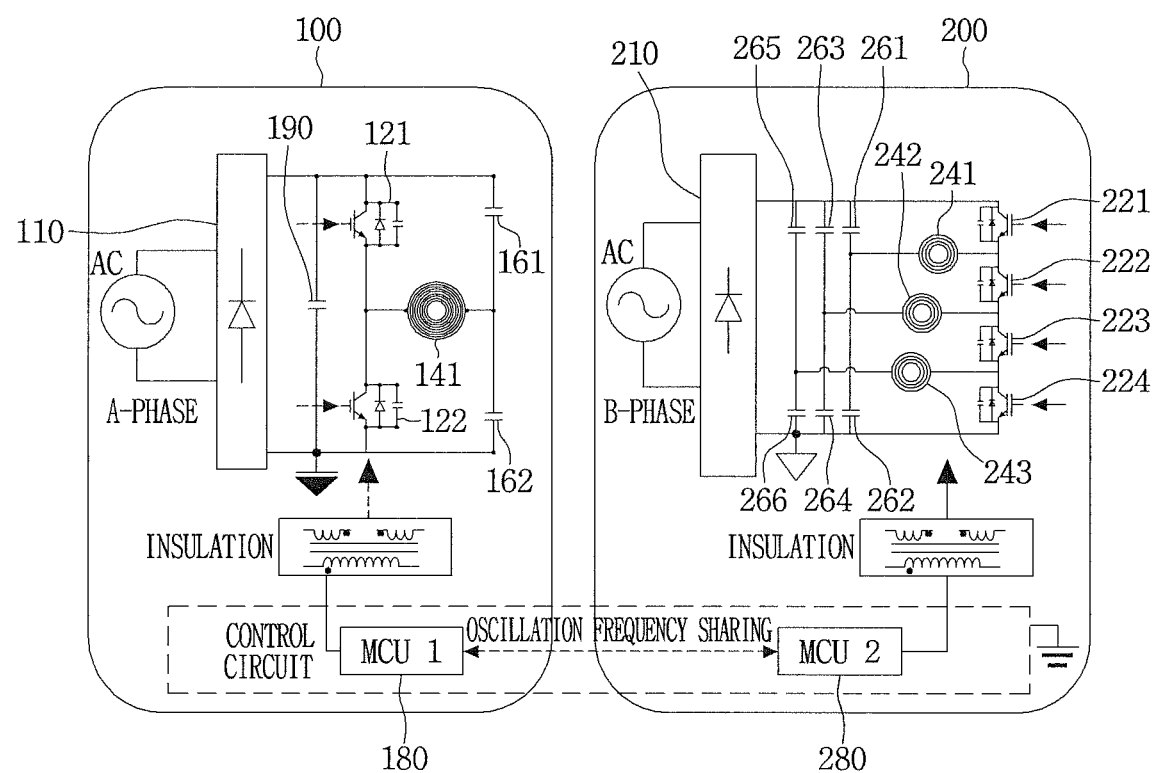
FIG. 2 is a diagram illustrating the structure of an electronic induction heat cooking apparatus according to an embodiment of the present invention.

FIG. 2 is a diagram illustrating the structure of an electronic induction heat cooking apparatus according to an embodiment of the present invention.

Referring to FIG. 2, the electronic induction heat cooking apparatus includes first and second cooker modules 100 and 200 including at least one heating coil and a dual heating coil. A three-phase voltage is applied to the electronic induction heat cooking apparatus. An A-phase voltage is applied to the first cooker module 100 and a B-phase voltage is applied to the second cooker module 200.

The first cooker module 100 includes a first rectifier 110 for receiving a commercial alternating current (AC) voltage and rectifying the AC voltage to a direct current (DC) voltage, first and second switching elements 121 and 122 connected to each other in series between positive and negative terminals of the first rectifier 110 and switched according to control signals, and an inner coil 141, one end of which is connected to a contact point between the first and second switching elements 121 and 122, and, the other end of which is connected between a first resonance capacitor 161 connected to one end of the rectifier 110 and a second resonance capacitor 162 connected to the other end of the rectifier 110.

In addition, a first microcontroller unit (MCU) 180 for providing gate control signals of the first and second switching elements 121 and 122 to control switching operation is further included.

One end of the first switching element 121 is connected to the positive terminal and the other end thereof is connected to the second switching element 122. One end of the second switching element 122 is connected to the first switching element 121 and the other end thereof is connected to the negative terminal.

In addition, a first DC capacitor 190 connected between both ends of the first rectifier 110 may be further included. The first DC capacitor 190 reduces ripple of the DC voltage output from the first rectifier 110.

Although the inner coil 141 is connected between the first resonance capacitor 161 and the second resonance capacitor 162 in this embodiment, the first resonance capacitor 161 or the second resonance capacitor 162 may be omitted.

An anti-parallel diode may be connected to each of the first and second switching elements 121 and 122. In order to minimize switching loss of the first and second switching elements, an auxiliary resonance capacitor may be connected to the anti-parallel diode in parallel.

The second cooker module 200 includes a second rectifier 210 for receiving a commercial AC voltage and rectifying the AC voltage to a DC voltage, first, second, third and fourth switching elements 221, 222, 223 and 224 connected to one another in series between positive and negative terminals of the second rectifier 210 and switched according to control signals, a first heating coil 241, one end of which is connected to a contact point between the first switching element 221 and the second switching element 222, and, the other end of which is connected between a first resonance capacitor 261 connected to one end of the second rectifier 210 and a second resonance capacitor 262 connected to the other end of the second rectifier 210, a second heating coil 242, one end of which is connected to a contact point between the second switching element 222 and the third switching element 223, and, the other end of which is connected to a third resonance capacitor 262 connected to one end of the second rectifier 210 and a fourth resonance capacitor 264 connected to the other end of the second rectifier 210, and an outer coil 243, one end of which is connected to a contact point between the third switching element 223 and the fourth switching element 224, and, the other end of which is connected between a fifth resonance capacitor 265 connected to one end of the second rectifier 210 and a sixth resonance capacitor 266 connected to the other end of the second rectifier 210.

A second microcontroller unit (MCU) 280 for providing gate control signals of the switching elements 221, 222, 223 and 224 to control switching operation is further included.

The microcontroller units 180 and 280 may be insulated from the switching elements 121, 122, 221, 222, 223 and 224 in order to deliver the gate signals to the switching elements 121, 122, 221, 222, 223 and 224.

One end of the first switching element 221 is connected to the positive terminal and the other end thereof is connected to the second switching element 222. One end of the second switching element 222 is connected to the first switching element 221 and the other end thereof is connected to the third switching element 223. One end of the third switching element 223 is connected to the second switching element 222 and the other end thereof is connected to the fourth switching element 224. One end of the fourth switching element 224 is connected the third switching element and the other end thereof is connected to the negative terminal.

In addition, a second DC capacitor 290 connected between both ends of the second rectifier 210 may be further included. The second DC capacitor 290 reduces ripple of the DC voltage output from the second rectifier 210.

Although the first heating coil 241 is connected between the first resonance capacitor 261 and the second resonance capacitor 262 in this embodiment, the first resonance capacitor 261 or the second resonance capacitor 262 may be omitted.

Although the second heating coil 242 is connected between the third resonance capacitor 263 and the fourth resonance capacitor 264 in this embodiment, similarly to the first heating coil 241, the third resonance capacitor 263 or the fourth resonance capacitor 264 may be omitted.

Although the outer coil 243 is connected between the fifth resonance capacitor 265 and the sixth resonance capacitor 266 in this embodiment, similarly to the first heating coil 241, the fifth resonance capacitor 265 or the sixth resonance capacitor 266 may be omitted.

An anti-parallel diode may be connected to each of the switching elements 221, 222, 223 and 224. In order to minimize switching loss of the switching elements, an auxiliary resonance capacitor may be connected to the anti-parallel diode in parallel.

Although the first cooker module 100 includes the inner coil 141 and the second cooker module 200 includes the outer coil 243 in this embodiment, the first cooker module 100 may include the outer coil 243 and the second cooker module 200 may include the inner coil 141.

In the embodiment of the present invention, the switching elements 121 and 122 of the first cooker module 100 for receiving the A-phase voltage and the switching elements 221, 222, 223 and 224 of the second cooker module 200 for receiving the B-phase voltage may be connected to different grounds because the received voltages are different.

In the dual mode in which the inner coil 142 and the outer coil 242 are simultaneously driven, efficiency may be reduced unless the inner coil 142 and the outer coil 242 operate with the same frequency. Accordingly, the microcontrollers 180 and 280 should control the inner coil 142 and the outer coil 242 to operate with the same frequency.

Accordingly, the microcontroller units 180 and 280 share an oscillator and control the inner coil 142 and the outer coil 242 to operate with the same frequency. The microcontroller units 180 and 280 share the oscillator and thus are connected to the same ground.

Even when the frequencies of the microcontroller units 180 and 280 are set to be the same in the oscillator, the frequencies of the inner coil 142 and the outer coil 242 may be different due to error of the oscillator. In this case, an undulation phenomenon may be generated due to the frequency difference and thus noise may be generated.

At this time, when the microcontroller units 180 and 280 share the oscillation frequency, the inner coil 142 and the outer coil 242 may operate with the same frequency without error. Accordingly, it is possible to solve efficiency reduction and noise occurrence by the frequency difference.

Figure 3:
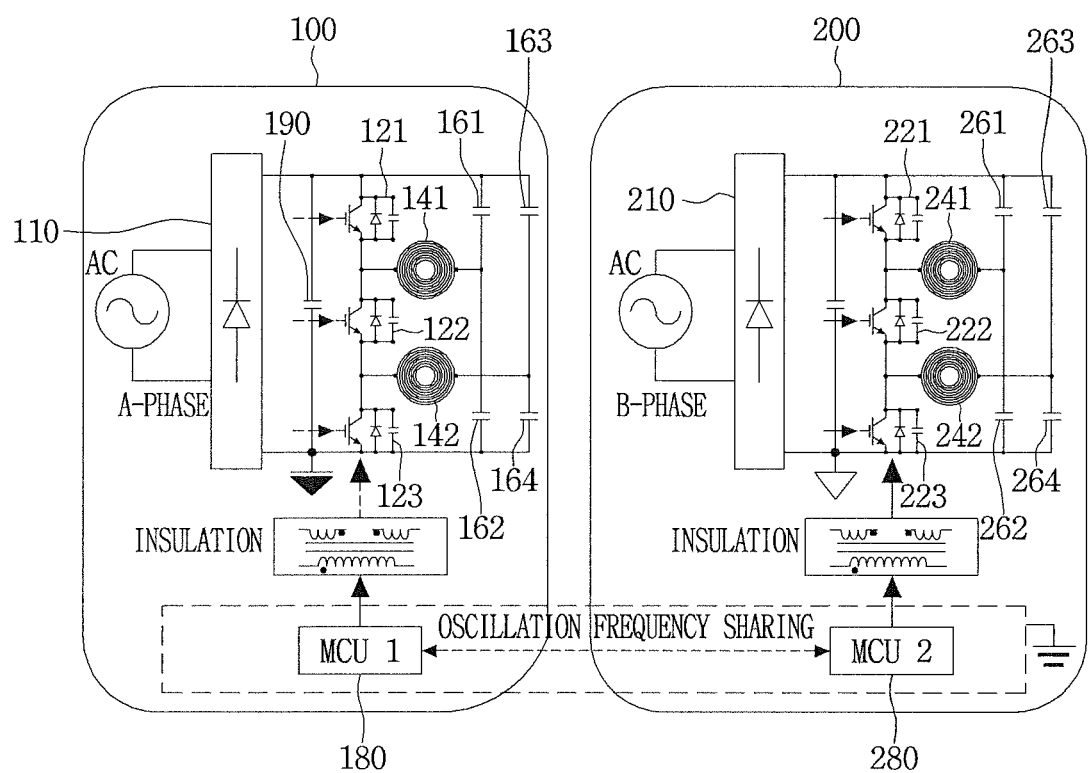
FIG. 3 is a diagram illustrating the structure of an electronic induction heat cooking apparatus according to another embodiment of the present invention.

FIG. 3 is a diagram illustrating the structure of an electronic induction heat cooking apparatus according to another embodiment of the present invention.

Referring to FIG. 3, the electronic induction heat cooking apparatus includes first and second cooker modules 100 and 200 including at least one heating coil and a dual heating coil. A three-phase voltage is applied to the electronic induction heat cooking apparatus. An A-phase voltage is applied to the first cooker module 100 and a B-phase voltage is applied to the second cooker module 200.

The first cooker module 100 includes a first rectifier 110 for receiving a commercial alternating current (AC) voltage and rectifying the AC voltage to a direct current (DC) voltage, first, second and third switching elements 121, 122 and 123 connected to one another in series between positive and negative terminals of the first rectifier 110 and switched according to control signals, a first heating coil 141, one end of which is connected to a contact point between the first and second switching elements 121 and 122, and, the other end of which is connected between a first resonance capacitor 161 connected to one end of the first rectifier 110 and a second resonance capacitor 162 connected to the other end of the first rectifier 110, and an inner coil 142, one end of which is connected to a contact point between the second and third switching elements 123, and, the other end of which is connected to a third resonance capacitor 163 connected to one end of the first rectifier 110 and a fourth resonance capacitor 164 connected to the other end of the first rectifier 110.

In addition, a first microcontroller unit (MCU) 180 for controlling switching operations of the first, second and third switching elements 121, 122 and 123 is further included.

One end of the first switching element 121 is connected to the positive terminal and the other end thereof is connected to the second switching element 122. One end of the second switching element 122 is connected to the first switching element 121 and the other end thereof is connected to the third switching element 123. One end of the third switching element is connected to the second switching element 122 and the other end thereof is connected to the negative terminal.

In addition, a first DC capacitor 190 connected between both ends of the first rectifier 110 may be further included. The first DC capacitor 190 reduces ripple of the DC voltage output from the first rectifier 110.

Although the first heating coil 141 is connected between the first resonance capacitor 161 and the second resonance capacitor 162 in this embodiment, the first resonance capacitor 161 or the second resonance capacitor 162 may be omitted.

Although the inner coil 142 is connected between the third resonance capacitor 163 and the fourth resonance capacitor 164 in this embodiment, the third resonance capacitor 163 or the fourth resonance capacitor 164 may be omitted.

An anti-parallel diode may be connected to each of the first, second and switching elements 121, 122 and 123. In order to minimize switching loss of the first, second and switching elements 121, 122 and 123, an auxiliary resonance capacitor may be connected to the anti-parallel diode in parallel.

The second cooker module 200 includes a second rectifier 210 for receiving a commercial alternating current (AC) voltage and rectifying the AC voltage to a direct current (DC) voltage, first, second and third switching elements 221, 222 and 223 connected to one another in series between positive and negative terminals of the second rectifier 210 and switched according to control signals, a second heating coil 241, one end of which is connected to a contact point between the first and second switching elements 221 and 222, and, the other end of which is connected between a first resonance capacitor 261 connected to one end of the second rectifier 210 and a second resonance capacitor 262 connected to the other end of the second rectifier 210, and an outer coil 242, one end of which is connected to a contact point between the second and third switching elements 222 and 223, and, the other end of which is connected to a third resonance capacitor 263 connected to one end of the second rectifier 210 and a fourth resonance capacitor 264 connected to the other end of the second rectifier 210.

In addition, a first microcontroller unit (MCU) 280 for controlling switching operations of the first, second and third switching elements 221, 222 and 223 is further included.

The microcontroller units 180 and 280 may be insulated from the switching elements 121, 122, 123, 221, 222 and 223 in order to deliver the gate signals to the switching elements 121, 122, 123, 221, 222 and 223.

One end of the first switching element 221 is connected to the positive terminal and the other end thereof is connected to the second switching element 222. One end of the second switching element 222 is connected to the first switching element 221 and the other end thereof is connected to the third switching element 223. One end of the third switching element 223 is connected to the second switching element 222 and the other end thereof is connected to the negative terminal.

In addition, a second DC capacitor 290 connected between both ends of the second rectifier 210 may be further included. The second DC capacitor 290 reduces ripple of the DC voltage output from the second rectifier 210.

Although the first heating coil 241 is connected between the first resonance capacitor 261 and the second resonance capacitor 262 in this embodiment, the first resonance capacitor 261 or the second resonance capacitor 262 may be omitted.

Although the outer coil 242 is connected between the third resonance capacitor 263 and the fourth resonance capacitor 264 in this embodiment, similarly to the first heating coil 241, the third resonance capacitor 263 or the fourth resonance capacitor 264 may be omitted.

An anti-parallel diode may be connected to each of the first, second and switching elements 221, 222 and 223. In order to minimize switching loss of the first, second and switching elements 221, 222 and 223, an auxiliary resonance capacitor may be connected to the anti-parallel diode in parallel.

Although the first cooker module 100 includes the inner coil 142 and the second cooker module 200 includes the outer coil 242 in this embodiment, the first cooker module 100 may include the outer coil 242 and the second cooker module 200 may include the inner coil 142.

In the embodiment of the present invention, the switching elements 121, 122 and 123 of the first cooker module 100 for receiving the A-phase voltage and the switching elements 221, 222 and 223 of the second cooker module 200 for receiving the B-phase voltage may be connected to different grounds because the received voltages are different. However, the microcontroller units 180 and 280 for providing the gate control signals of the switching elements 121, 122, 123, 221, 222 and 223 are connected to the same ground.

In the present invention, the microcontroller units 180 and 280 share an oscillator, are connected to the same ground and share the same oscillation frequency. In the dual mode in which the inner coil 142 and the outer coil 242 are simultaneously driven, the microcontroller units 180 and 280 are driven with the same oscillation frequency and thus the inner coil 142 and the outer coil 242 may operate with the same frequency.

Figure 4:
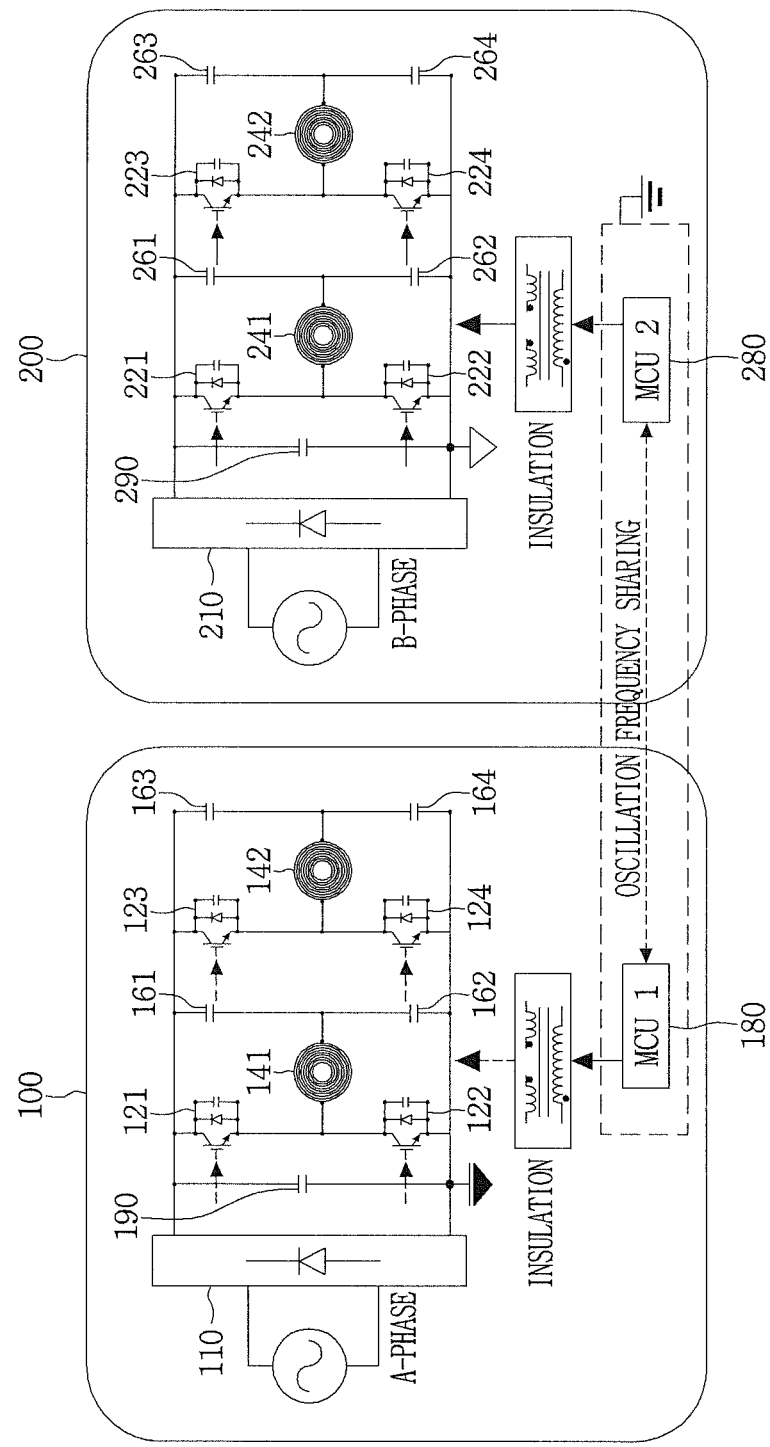
FIG. 4 is a diagram illustrating the structure of an electronic induction heat cooking apparatus according to another embodiment of the present invention.

FIG. 4 is a diagram illustrating the structure of an electronic induction heat cooking apparatus according to another embodiment of the present invention.

Referring to FIG. 4, the electronic induction heat cooking apparatus includes first and second cooker modules 100 and 200 including at least one heating coil and a dual heating coil. A three-phase voltage is applied to the electronic induction heat cooking apparatus. An A-phase voltage is applied to the first cooker module 100 and a B-phase voltage is applied to the second cooker module 200.

The first cooker module 100 includes a first rectifier 110 for receiving a commercial alternating current (AC) voltage and rectifying the AC voltage to a direct current (DC) voltage, first and second switching elements 121 and 122 connected to each other in series between positive and negative terminals of the first rectifier 110 and switched according to control signals, a first heating coil 141, one end of which is connected to a contact point between the first and second switching elements 121 and 122, and, the other end of which is connected between a first resonance capacitor 161 connected to one end of the rectifier 110 and a second resonance capacitor 162 connected to the other end of the rectifier 110, third and fourth switching elements 123 and 124 connected to the first and second switching elements 121 and 122 in parallel and connected to each other in series between the positive and negative terminals of the first rectifier 110 and switched according to a control signal, and an inner coil 142, one end of which is connected to a contact point between the third switching element 123 and the fourth switching element 124, and, the other end of which is connected between a third resonance capacitor 163 connected to one end of the first rectifier 110 and a fourth resonance capacitor 164 connected to the other end of the first rectifier 110.

In addition, a first microcontroller unit (MCU) 180 for controlling switching operations of the first, second, third and fourth switching elements 121, 122, 123 and 124 is further included.

One end of the first switching element 121 is connected to the positive terminal and the other end thereof is connected to the second switching element 122. One end of the second switching element 122 is connected to the first switching element 121 and the other end thereof is connected to the negative terminal.

One end of the third switching element 122 is connected to the positive terminal and the other end thereof is connected to the fourth switching element 124. One end of the fourth switching element 124 is connected to the third switching element 123 and the other end thereof is connected to the negative terminal.

In addition, a first DC capacitor 190 connected between both ends of the first rectifier 110 may be further included. The first DC capacitor 190 reduces ripple of the DC voltage output from the first rectifier 110.

Although the first heating coil 141 is connected between the first resonance capacitor 161 and the second resonance capacitor 162 in this embodiment, the first resonance capacitor 161 or the second resonance capacitor 162 may be omitted.

Although the inner coil 142 is connected between the third resonance capacitor 163 and the fourth resonance capacitor 164 in this embodiment, the third resonance capacitor 163 or the fourth resonance capacitor 164 may be omitted.

An anti-parallel diode may be connected to each of the first, second, third and fourth switching elements 121, 122, 123 and 124. In order to minimize switching loss of the first, second, third and fourth switching elements 121, 122, 123 and 124, an auxiliary resonance capacitor may be connected to the anti-parallel diode in parallel.

The second cooker module 200 includes a second rectifier 210 for receiving a commercial AC voltage and rectifying the AC voltage to a DC voltage, first and second switching elements 221 and 222 connected in series between positive and negative terminals of the second rectifier 210, a first heating coil 241, one end of which is connected to a contact point between the first switching element 221 and the second switching element 222, and, the other end of which is connected between a first resonance capacitor 261 connected to one end of the second rectifier 210 and a second resonance capacitor 262 connected to the other end of the second rectifier 210, third and fourth switching elements 223 and 224 connected to the first and second switching elements 221 and 222 in parallel and connected to each other in series between the positive and negative terminals of the second rectifier 210 and switched according to a control signal, and an outer coil 242, one end of which is connected to a contact point between the third switching element 223 and the fourth switching element 224, and, the other end of which is connected to a third resonance capacitor 262 connected to one end of the second rectifier 210 and a fourth resonance capacitor 264 connected to the other end of the second rectifier 210.

A second microcontroller unit (MCU) 280 for controlling switching operations of the first, second, third and fourth switching elements 221, 222, 223 and 224 is further included.

The microcontroller units 180 and 280 may be insulated from the switching elements 121, 122, 123, 124, 221, 222, 223 and 224 in order to deliver gate signals to the switching elements 121, 122, 123, 124, 221, 222, 223 and 224.

One end of the first switching element 221 is connected to the positive terminal and the other end thereof is connected to the second switching element 222. One end of the second switching element 222 is connected to the first switching element 221 and the other end thereof is connected to the negative terminal.

One end of the third switching element 223 is connected to the positive terminal and the other end thereof is connected to the fourth switching element 224. One end of the fourth switching element 224 is connected the third switching element 223 and the other end thereof is connected to the negative terminal.

In addition, a second DC capacitor 290 connected between both ends of the second rectifier 210 may be further included. The second DC capacitor 290 reduces ripple of the DC voltage output from the second rectifier 210.

Although the first heating coil 241 is connected between the first resonance capacitor 261 and the second resonance capacitor 262 in this embodiment, the first resonance capacitor 261 or the second resonance capacitor 262 may be omitted.

Although the outer coil 242 is connected between the third resonance capacitor 263 and the fourth resonance capacitor 264 in this embodiment, similarly to the first heating coil 241, the third resonance capacitor 263 or the fourth resonance capacitor 264 may be omitted.

An anti-parallel diode may be connected to each of the switching elements 221, 222, 223 and 224. In order to minimize switching loss of the switching elements 221, 222, 223 and 224, an auxiliary resonance capacitor may be connected to the anti-parallel diode in parallel.

Although the first cooker module 100 includes the inner coil 142 and the second cooker module 200 includes the outer coil 242 in this embodiment, the first cooker module 100 may include the outer coil 242 and the second cooker module 200 may include the inner coil 142.

In the embodiment of the present invention, the switching elements 121, 122, 123 and 124 of the first cooker module 100 for receiving the A-phase voltage and the switching elements 221, 222, 223 and 224 of the second cooker module 200 for receiving the B-phase voltage may be connected to different grounds because the received voltages are different. However, the microcontroller units 180 and 280 for providing the gate control signals of the switching elements 121, 122, 123, 124, 221, 222, 223 and 224 are connected to the same ground.

In the present invention, the microcontroller units 180 and 280 share an oscillator, are connected to the same ground and share the same oscillation frequency. In the dual mode in which the inner coil 142 and the outer coil 242 are simultaneously driven, the microcontroller units 180 and 280 are driven with the same oscillation frequency and thus the inner coil 142 and the outer coil 242 may operate with the same frequency.

The embodiment of the present invention provides an electronic induction heat cooking apparatus having a plurality of heating coils, which is capable of being controlled using a minimum number of switching elements.

The embodiment of the present invention provides an electronic induction heat cooking apparatus capable of improving efficiency by controlling an inner coil and an outer coil with the same oscillation frequency.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic induction heat cooking apparatus comprising:
   a first cooker module and a second cooker module that include at least one heating coil and a dual heating coil, the dual heating coil including an inner coil and an outer coil,
   wherein the first cooker module includes:
      the inner coil of the dual heating coil,
      a plurality of switching elements configured to operate the inner coil, and
      a first microcontroller unit insulated from the plurality of switching elements and configured to control the plurality of switching elements,
   wherein the second cooker module includes:
      the outer coil of the dual heating coil,
      a plurality of switching elements configured to operate the outer coil of the dual heating coil, and
      a second microcontroller unit insulated from the plurality of switching elements of the second cooker module and configured to control the plurality of switching elements of the second cooker module,
   wherein the first microcontroller unit and the second microcontroller unit are connected to a same ground,
   wherein each of the plurality of switching elements of the first cooker module and each of the plurality of switching elements of the second cooker module are connected to different grounds,
   wherein the first microcontroller unit and the second microcontroller unit share an oscillator,
   wherein the first microcontroller unit and the second microcontroller unit share an oscillator frequency and are configured to control the inner coil and the outer coil to operate with a same operation frequency,
   wherein the plurality of switching elements of the second cooker module include:
      first, second, third, and fourth switching elements connected to one another in series between a positive terminal of a rectifier and a negative terminal of the rectifier, wherein the second cooker module further includes:
      a first heating coil having one end connected to a contact point between the first switching element and the second switching element, and another end connected between a first resonance capacitor connected to one end of the rectifier and a second resonance capacitor connected to another end of the rectifier, and
      a second heating coil having one end connected to a contact point between the second switching element and the third switching element, and another end connected to a third resonance capacitor connected to the one end of the rectifier and a fourth resonance capacitor connected to the another end of the rectifier,
   wherein the outer coil of the dual heating coil has one end connected to a contact point between the third switching element and the fourth switching element, and another end connected between a fifth resonance capacitor connected to the one end of the rectifier and a sixth resonance capacitor connected to the another end of the rectifier,
   wherein one end of the first switching element is connected to the positive terminal of the rectifier, and another end of the first switching element is connected to the second switching element, wherein one end of the second switching element is connected to the first switching element, and another end of the second switching element is connected to the third switching element, wherein one end of the third switching element is connected to the second switching element, and another end of the third switching element is connected to the fourth switching element, and wherein one end of the fourth switching element is connected the third switching element, and another end of the fourth switching element is connected to the negative terminal of the rectifier.

2. The electronic induction heat cooking apparatus according to claim 1, wherein a three-phase voltage is applied to the first cooker module and the second cooker module.

3. The electronic induction heat cooking apparatus according to claim 2, wherein an A-phase voltage of the three-phase voltage is applied to the first cooker module and a B-phase voltage of the three-phase voltage is applied to the second cooker module.

4. The electronic induction heat cooking apparatus according to claim 1, wherein the first microcontroller unit and the second microcontroller unit are configured to remove a frequency error of the oscillator to thereby control the inner coil and the outer coil to operate with the same operation frequency.

* * * * *